United States Patent [19]

Ohmori et al.

[11] Patent Number: 4,652,282

[45] Date of Patent: Mar. 24, 1987

[54] ELECTRETIZED MATERIAL FOR A DUST FILTER

[75] Inventors: Susumu Ohmori, Okayama; Akira Yagi; Satoshi Takase, both of Otsu, all of Japan

[73] Assignee: Toyo Boseki Kabushiki Kaisha, Japan

[21] Appl. No.: 712,488

[22] Filed: Mar. 18, 1985

[30] Foreign Application Priority Data

Mar. 19, 1984 [JP] Japan .................................. 59-53270

[51] Int. Cl.$^4$ ............................................... B03C 3/02
[52] U.S. Cl. ............................... 55/155; 55/DIG. 39; 524/400; 524/583
[58] Field of Search .................. 55/155, 103, DIG. 39, 55/528; 307/400; 264/22, 27; 524/400, 583

[56] References Cited

U.S. PATENT DOCUMENTS

| | | | |
|---|---|---|---|
| 4,000,102 | 12/1976 | Shima et al. | 264/22 |
| 4,187,157 | 12/1979 | Turnhout et al. | 55/155 |
| 4,215,682 | 8/1980 | Kubik et al. | 55/103 |
| 4,254,028 | 3/1981 | Ono et al. | 524/400 |
| 4,323,374 | 4/1982 | Shinagawa et al. | 55/155 |
| 4,375,718 | 3/1983 | Wadsworth et al. | 55/155 |
| 4,486,365 | 12/1984 | Kliemann et al. | 264/22 |
| 4,501,840 | 2/1985 | Werle et al. | 524/400 |

Primary Examiner—Bernard Nozick
Attorney, Agent, or Firm—Jones, Tullar & Cooper

[57] ABSTRACT

An electretized material for a dust filter which is made of an insulating polymer material such as polypropylene incorporated with a fatty acid metal salt in an amount of not less than 100 ppm in terms of the metal.

2 Claims, 3 Drawing Figures

ELECTRETIZED MATERIAL FOR A DUST FILTER

The present invention relates to an electretized material for use in making a dust filter and to the manufacture of the electretized material. More particularly, it relates to electretized material for use in making a dust-removing filter the electretized material being made of an insulating polymer material having permanent dielectric polarization, and to the manufacture of the electretized material.

The term "electretized" as hereinafter used is intended to mean "electrified to make an electret" or "electrified to possess permanent dielectric polarization".

Dust filters are widely used in air conditioning systems for keeping the dust concentration in the air low, particularly in hospitals, electronics plants, precision factories, etc. Among various dust filters, those made of electret fibers have high dust removing performances and are therefore suitable for attaining a high degree of cleanliness. Disadvantageously, however, those as conventionally manufactured can not maintain their dielectric polarization over a long period of time.

For manufacture of a dust filter made of electret fibers, Japanese Patent Publication (examined) No. 47299/81 discloses the process wherein non-polar polymer materials are shaped into films, which are drawn and corona-charged. The thus charged films are then treated with needle rolls to make fibrous materials, which are constructed into dust filters. Further, for instance, Japanese Patent Publication (unexamined) No. 133680/79 discloses the process which comprises subjecting a non-woven fabric made of polypropylene fibers and rayon fibers to resin processing and then to bending or shearing, whereby the surface layer of the fabric is charged with static electricity. However, these processes can not assure sufficiently permanent dielectric polarization. Further, they require troublesome operations and are inferior in productivity.

As a result of a extensive study, it has been found that the incorporation of a fatty acid metal salt into an insulating polymer material can provide the polymer material with permanent dielectric polarization by simple electrification operation. It has also been found that a dust filter made of the resultant electret fibers can maintain high dust removing performances over a long period of time.

According to the present invention, there is provided an electretized material for use in making a dust filter, the material including insulating polymer material incorporated with a fatty acid metal salt, which maintains high dust removing performances over a long period of time. Advantageously, such a dust filter is low in pressure drop.

As the insulating polymer material, there may be used any polymer having a large volume resistance, preferably of not less than about $10^{15}$ ohm.cm, which is optionally spinnable. Specific examples are polypropylene, polyethylene, polyester, polyamide, polyvinyl chloride, polymethyl methacrylate, etc. As the fatty acid portion of the fatty acid metal salt, there are exemplified lauric acid, palmitic acid, stearic acid, oleic acid, etc. Examples of the metal portion in the fatty acid metal salt are aluminum, magnesium, zinc, etc. The amount of the fatty acid metal salt to be incorporated may be about 100 ppm or more, preferably from about 200 ppm to 2,000 ppm, in terms of the metal.

For preparation of the dust filter of the invention, the insulating polymer material incorporated with the fatty acid metal salt is electretized by a per se conventional procedure such as rubbing or corona charge treatment, and then the resultant electretized material is constructed into a filter by a per se conventional procedure. One of the typical methods comprises melt shaping of the insulating polymer material containing the fatty acid metal salt, drawing the resulting shaped product simultaneously or subsequently with electretizing and constructing the electretized product into a filter.

For instance, the insulating polymer material is incorporated with the fatty acid metal salt, and the resultant mixture is melt spun to make an undrawn filament. The undrawn filament is drawn slidingly on a hot plate to make a drawn filament as frictionally charged. In place of or in addition to the sliding drawing, corona charging may be applied thereto. The drawn filament is blown onto a net stretched over a suction box by air jetting to form a spun bond-like sheet, followed by needle punching to make a filter. Said drawn filament may be wound up as such and then constructed into a filter.

Alternatively, the insulating polymer material incorporated with the fatty acid metal salt may be molten and formed into an undrawn film. The undrawn film is then slidingly drawn on a hot plate to make a uniaxially drawn film as frictionally charged, which is then split to make fibers. In place of or in addition to said sliding drawing, corona charging may be applied thereto. The fibers are constructed to make a filter.

Drawing of an undrawn shaped material is usually carried out while contacting it onto a hot plate or while keeping it in the hot atmosphere without contacting onto a hot plate. In the case where the electretizing is performed by rubbing or friction, it is preferred that the undrawn shaped material is drawn slidingly on a hot plate; i.e. drawing is effected simultaneously with application of friction. It is also possible to effect drawing and application of friction stepwise. Namely, the undrawn shaped material is first drawn and then subjected to friction treatment; in this case, it is necessary to keep the inside of the drawn shaped material at a stressed state. When stepwise drawing is adopted, the first step drawing may be carried out by any optional operation, and the second step drawing can be performed by sliding on a friction plate under a tensioned state. In the case where the electretizing is performed by corona charging, the undrawn shaped material may be drawn slidingly on a hot plate, and simultaneously or subsequently corona charging may be applied onto said shaped material running slidingly on a metal plate under a stressed state.

Figure 1:
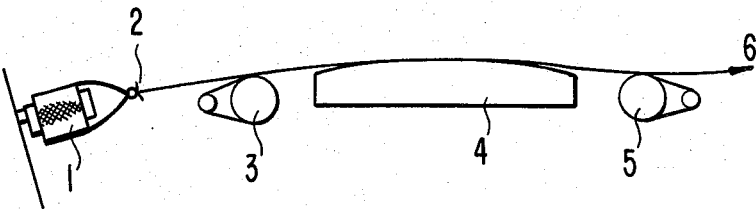
FIG. 1 is a schematic illustration of a drawing apparatus used for the present invention with a hot plate between the feed roller and the draw roller.
Figure 2:
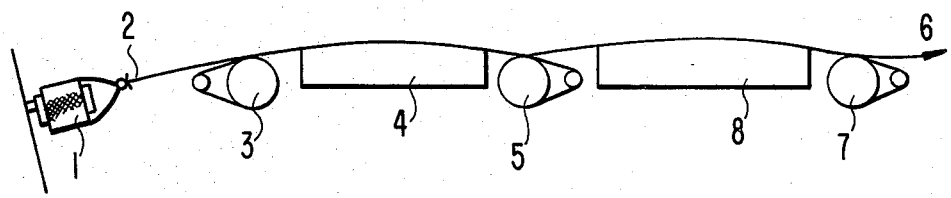
FIG. 2 is a schematic illustration of a drawing apparatus used for the present invention including both a hot plate and a friction plate between the feed roller and the draw roller.

Preparation of the drawn filament as frictionally charged may be made, for instance, by the use of a drawing apparatus as shown in FIG. 1 or 2 of the accompanying drawings. In these Figures, an undrawn filament (1) obtained by melt spinning a polymer material incorporated with a fatty acid metal salt in an amount of not less than 100 ppm in terms of the metal is delivered through a guide (2) by the aid of a feed roller (3), runs slidingly on a hot plate (4) kept at a temperature of 50° to 150° C., preferably of 100° to 130° C. and is drawn by the aid of a draw roller (5), which is rotating at a higher speed than the feed roller (3). In case of FIG. 2, drawing with a draw ratio of 1.5 to 10 is effected between the feed roller (3) and the draw roller (5) by any optional means. The drawn filament from the roller (5) runs slidingly on a friction plate (8) and is delivered by the aid of a draw roller (7) under a certain tension, which is preferably obtained by keeping the ratio of the circumferential speed of the roller (7) to that of the roller (5) being not less than 0.9, preferably not less than 0.95, more preferably from 1.0 to 1.3 when the drawing condition between the rollers (3) and (5) is so set as attaining 75–80% or more of the maximum draw ratio.

By the above procedure, the undrawn filament is drawn and frictionally charged simultaneously or sequentially to give an electretized drawn filament (6). FIGS. 1 and 2 show the undrawn filament (1) wound in a cheese form. However, the undrawn filament from the melt spinning process may be directly introduced into the drawing apparatus without winding in a cheese form. Further, in FIG. 2, a drawn filament drawn by an optional method and wound in a cheese form may be introduced to the draw roller (5). The draw ratio on drawing of the undrawn filament is not limitative and may be usually from 1.5 to 10. Also, no limitation is not present on the denier of the filament as drawn.

Figure 3:
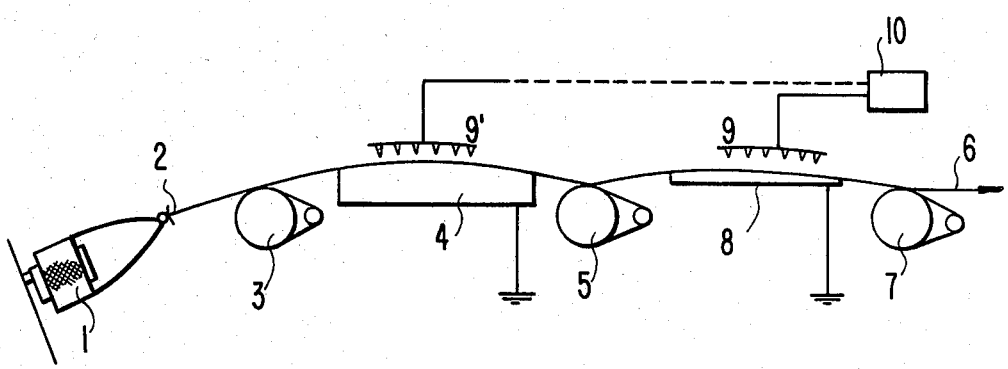
FIG. 3 is a schematic illustration of a drawing apparatus used for the present invention including a corona charging device employed with a grounded hot plate and friction plate.

Preparation of the drawn filament as electrified by corona charging may be carried out, for instance, by the use of a drawing apparatus as shown in FIG. 3. This drawing apparatus is the same as that shown in FIG. 2 at the major portion and may be operated in the same manner as above. However, the hot plate (4) and the metal plate (8) are earthed, and the filament running slidingly thereon is subjected to corona charging with corona electrodes (9') and (9) by application of such a high voltage as 5 to 25 KV. In the above drawing apparatus, the corona electrode (9') may be omitted, and in this case, earthing at the hot plate (4) is not required. When corona charging with the corona electrode (9') is effected, the metal plate (8) and the draw roller (7) may be omitted. Still, (10) indicates a direct current high voltage source. The corona charging itself may be performed by the use of a conventional device.

It is well known that a polymer material having a high insulating property is electrified statically by rubbing or corona charging. However, electrification sufficient for a dust filter is not obtainable by rubbing and/or corona charging only. When the polymer material is incorporated with a fatty acid metal salt according to this invention, rubbing and/or corona charging is effective to assure a sufficient electrification for a dust filter. In fact, the polymer material incorporated with a fatty acid metal salt can keep its static charge at a high level even after constructed into a dust filter, and thus high dust removing performances are exerted by the electrostatic field inside the filter.

The electretized dust filter of the invention can maintain the electrification over a long period of time and efficiently catch the dust in the air by the coulomb force or the exciting force. It is suitable to catch the dust having a particle size of about 0.1 to 1 micron such as tobacco smoke, flower powder, sand dust, etc. and also for purifying the air in living rooms or cars. Thus, it is useful as dust preventing masks, cleaning cloths for removing dust deposited on furniture, etc.

Practical embodiments of the present invention will be illustratively shown in the following Examples wherein part(s) are by weight.

EXAMPLE 1

Polypropylene as the insulating polymer material was incorporated with magnesium stearate $(C_{17}H_{35}COO)_2Mg$ as the fatty acid metal salt in an amount of 500 ppm in terms of Mg, and the resultant mixture was melt spun to make an undrawn filament (A). The undrawn filament (A) was drawn with a draw rate of 46 m/min at a draw ratio of 2.7 while rubbing by the use of an apparatus as shown in FIG. 2 to make a drawn rubbed filament (B). Also, the undrawn filament was rubbed on a metal plate at 46 m/min without drawing to make an undrawn rubbed filament (C). Using each of the filaments (A), (B) and (C), a dust filter in a mat form having a fiber size of 7 denier and a weight of 200 g/m² was constructed. The dust removing efficiency (Ei) of the dust filter was determined at a passing speed of 10 cm/sec on the atmospheric dust having a particle size of 0.5 to 1.0 micron according to the light scattering counting method. The results are shown in Table 1 wherein the pressure drop as determined is also shown.

TABLE 1

| | | Dust removing efficiency (%) | Pressure drop (mmAg) |
|---|---|---|---|
| Example 1 | Drawing and rubbing (Filament (B)) | 80.4 | 0.51 |
| Comparative | Undrawing and rubbing (Filament (C)) | 52.3 | 0.48 |
| Comparative | Undrawing and non-rubbing (Filament (A)) | 19.7 | 0.44 |

EXAMPLE 2

Polypropylene as the insulating polymer material was incorporated with magnesium stearate $(C_{17}H_{35}COO)_2Mg$ as the fatty acid metal salt in an amount as shown in Table 2, and the resultant mixture was melt spun to make an undrawn filament. The undrawn filament was frictionally drawn on a hot plate set at a temperature of 110° C. with a draw rate of 42 m/min at a draw ratio of 3.0 by the use of an apparatus as shown in FIG. 2 to make an electretized drawn filament having a fineness of 6 denier. The electretized drawn filament was blown onto a mat by the use of air jetting to make a dust filter in a mat form having a weight of 200 g/m². The dust removing efficiency of the dust filter was measured and shown in Table 2 wherein the pressure drop is also shown.

TABLE 2

| Amount of magnesium stearate | 0% | 0.24% | 1.21% | 2.42% |
|---|---|---|---|---|
| Magnesium (ppm) | 0 | 100 | 500 | 1000 |
| Dust removing efficiency (%) | 33.4 | 69.3 | 85.5 | 87.5 |
| Pressure drop (mmAq) | 0.75 | 0.73 | 0.75 | 0.67 |

These dust filters showed no material change in dust removing efficiency even after 4 months from their manufacture.

EXAMPLE 3

Polypropylene as the insulating polymer material was incorporated with aluminum palmitate $(C_{15}H_{31}COO)_3Al$ as the fatty acid metal salt in an amount as shown in Table 3, and the resultant mixture was melt spun to make an undrawn filament. In the same manner as in Example 1 but using the undrawn filament as hereinabove prepared, there was prepared a dust filter in a mat form having a weight of 200 g/m². The dust removing efficiency of the dust filter was measured and shown in Table 3 wherein the pressure drop is also shown.

TABLE 3

| Amount of aluminium palmitate | 0% | 0.29% | 1.47% | 2.35% |
|---|---|---|---|---|
| Aluminium (ppm) | 0 | 100 | 500 | 800 |
| Dust removing efficiency (%) | 33.4 | 68.8 | 86.9 | 87.4 |
| Pressure drop (mmAq) | 0.75 | 0.72 | 0.70 | 0.75 |

These dust filters showed no material change in dust removing efficiency even after 3 months from their manufacture.

EXAMPLE 4

Polypropylene as the insulating polymer material was incorporated with magnesium stearate $(C_{17}H_{35}COO)_2Mg$ as the fatty acid metal salt in an amount as shown in Table 4, and the resultant mixture was melt spun to make an undrawn filament. Using an apparatus as shown in FIG. 2, the undrawn filament was frictionally drawn on a hot plate and a friction plate set at a temperature of 115° C. with a draw rate of 56 m/min at a draw ratio of 4.0 under a ratio of the circumferential speeds of the draw rollers (7) and (5) of 1.1 to make an electretized drawn filament having a fineness of 5 denier. In the same manner as in Example 1 but using the electretized drawn film as hereinabove prepared, there was prepared a dust filter having a weight of 200 g/m². The dust removing efficiency of the dust filter was measured and shown in Table 4 wherein the pressure drop is also shown.

TABLE 4

| Amount of magnesium stearate | 0% | 0.24% | 1.21% | 2.42% |
|---|---|---|---|---|
| Magnesium (ppm) | 0 | 100 | 500 | 1000 |
| Dust removing efficiency (%) | 35.8 | 79.7 | 89.8 | 90.1 |
| Pressure drop (mmAq) | 0.77 | 0.80 | 0.79 | 0.80 |

These dust filters showed no material change in dust removing efficiency even after 3 months from their manufacture.

EXAMPLE 5

Polypropylene as the insulating polymer material was incorporated with magnesium stearate $(C_{17}H_{35}COO)_2Mg$ as the fatty acid metal salt in an amount of 500 ppm in terms of Mg, and the resultant mixture was melt spun to make an undrawn filament. Using an apparatus as shown in FIG. 3 (the corona electrode (9') being not present), the undrawn filament was frictionally drawn on a hot plate set at a temperature of 115° C. with a draw rate of 42 m/min at a draw ratio of 3.0 and subjected to corona charge treatment while applying a voltage of −13 KV to the corona electrodes and keeping the ratio of the circumferential speeds of the draw rollers (7) and (5) before and after the corona charge at 1.0 to make an electretized drawn filament having a fineness of 6 denier. The electretized drawn filament was blown onto a net by the use of air jetting to make a dust filter in a mat form having a weight of 200 g/m². In the same manner as above, there were prepared (i) a dust filter which was not subjected to corona charge treatment, (ii) a dust filter which was not incorporated with magnesium stearate and (iii) a dust filter which was not incorporated with magnesium stearate and not subjected to corona charge treatment. Their dust removing efficiency was determined at a passing speed of 10 cm/sec on the atmospheric dust having a particle size of 0.5 to 1.0 micron according to the light scattering counting method and shown in Table 5 wherein the pressure drop is also shown.

TABLE 5

| | Not charged | | Corona charged | |
|---|---|---|---|---|
| Amount of magnesium stearate | Dust removing efficiency (%) | Pressure drop (mmAq) | Dust removing efficiency (%) | Pressure drop (mmAq) |
| Magnesium (500 ppm) | 85.5 | 0.75 | 94.5 | 0.76 |
| Not incorporated | 33.4 | 0.75 | 85.8 | 0.77 |

These dust filters showed no material change in dust removing property even after 4 months from their manufacture.

EXAMPLE 6

Polypropylene as the insulating polymer material was incorporated with aluminum palmitate $(C_{15}H_{31}COO)_3Al$ as the fatty acid metal salt in an amount of 500 pp in terms of Al, and the resultant mixture was melt spun to make an undrawn filament. In the same manner as in Example 5 but using the undrawn filament as hereinabove prepared, there was prepared a dust filter in a mat form having a weight of 200 g/m².

The dust removing efficiency of the dust filter was measured and shown in Table 6 wherein the pressure drop is also shown.

TABLE 6

| | Not charged | | Corona charged | |
|---|---|---|---|---|
| Amount of aluminum palmitate | Dust removing efficiency (%) | Pressure drop (mmAq) | Dust removing efficiency (%) | Pressure drop (mmAq) |
| Aluminium (500 ppm) | 86.9 | 0.70 | 95.1 | 0.71 |
| Not incorporated | 33.4 | 0.75 | 85.8 | 0.77 |

These dust filters showed no material change in dust removing property even after 4 months from their manufacture.

What is claimed is:

1. An electretized material for a filter to be used for elimination of dust from a dust-containing gas comprising a uniform mixture of an insulating polymer and a fatty acid metal salt, wherein the amount of the fatty acid metal salt is not less than 100 ppm in terms of the metal.

2. A dust filter according to claim 1, wherein the amount of the fatty acid metal salt is from 200 to 2,000 ppm in terms of the metal.

* * * * *